(12) United States Patent
Lee et al.

(10) Patent No.: US 9,465,863 B2
(45) Date of Patent: Oct. 11, 2016

(54) CONTENT-PROVIDING METHOD AND SYSTEM

(75) Inventors: Hyung-dong Lee, Seoul (KR); Seung-taek Park, Gyeonggi-do (KR); Hee-seon Park, Seoul (KR); Hae-dong Yeo, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/304,479

(22) Filed: Nov. 25, 2011

(65) Prior Publication Data

US 2012/0136861 A1 May 31, 2012

(30) Foreign Application Priority Data

Nov. 25, 2010 (KR) .................. 10-2010-0118105

(51) Int. Cl.
 *G06F 17/30* (2006.01)

(52) U.S. Cl.
 CPC ... *G06F 17/30702* (2013.01); *G06F 17/30867* (2013.01)

(58) Field of Classification Search
 USPC ......................................... 707/737
 See application file for complete search history.

(56) References Cited

U.S. PATENT DOCUMENTS

| | | | |
|---|---|---|---|
| 2001/0013009 A1 | 8/2001 | Greening et al. | |
| 2002/0052873 A1* | 5/2002 | Delgado et al. | 707/7 |
| 2004/0181604 A1 | 9/2004 | Immonen | |
| 2005/0222987 A1* | 10/2005 | Vadon | G06F 17/30997 |
| 2006/0136528 A1 | 6/2006 | Martin et al. | |
| 2007/0112704 A1* | 5/2007 | Tomkins | G06Q 10/10 706/21 |
| 2007/0219984 A1* | 9/2007 | Aravamudan et al. | 707/5 |
| 2008/0222676 A1 | 9/2008 | Yun et al. | |
| 2009/0052864 A1 | 2/2009 | Ohde | |
| 2009/0307176 A1* | 12/2009 | Jeong et al. | 706/52 |
| 2010/0011020 A1 | 1/2010 | Bouzid et al. | |
| 2010/0115060 A1 | 5/2010 | Julia et al. | |
| 2010/0125544 A1 | 5/2010 | Lee et al. | |
| 2010/0174670 A1* | 7/2010 | Malik et al. | 706/12 |
| 2012/0016886 A1* | 1/2012 | Cohen | G06F 17/18 707/748 |
| 2015/0161176 A1* | 6/2015 | Majkowska | G06F 17/30277 707/722 |

FOREIGN PATENT DOCUMENTS

| | | |
|---|---|---|
| CN | 101079063 | 11/2007 |
| JP | 2004-515145 | 5/2004 |
| JP | 2005318343 | 11/2005 |
| JP | 2005-352754 | 12/2005 |
| JP | 2008-233295 | 10/2008 |
| JP | 2009-239686 | 10/2009 |
| JP | 2010-072727 | 4/2010 |

(Continued)

OTHER PUBLICATIONS

Chinese Office Action dated Oct. 16, 2015 issued in counterpart application No. 201180056996.2, 14 pages.

(Continued)

*Primary Examiner* — Jensen Hu
(74) *Attorney, Agent, or Firm* — The Farrell Law Firm, P.C.

(57) ABSTRACT

A content-providing method and system, including identifying a representative type cluster by clustering content related to behavioral data which represents a use history of a user, according to type of the content, mapping the representative type cluster to a time interval, and storing the representative type cluster and the time interval.

14 Claims, 6 Drawing Sheets

(56) References Cited

FOREIGN PATENT DOCUMENTS

| KR | 1020100043639 | 4/2010 |
| KR | 1020100096975 | 9/2010 |
| WO | WO 02/42959 | 5/2002 |
| WO | WO 2006/099608 | 9/2006 |
| WO | WO 2010/119807 | 10/2010 |

OTHER PUBLICATIONS

Japanese Office Action dated Jan. 27, 2015 issued in counterpart application No. 2013-539779.
European Search Report dated Jul. 14, 2016 issued in counterpart application No. 11842778.0-1951, 8 pages.

* cited by examiner

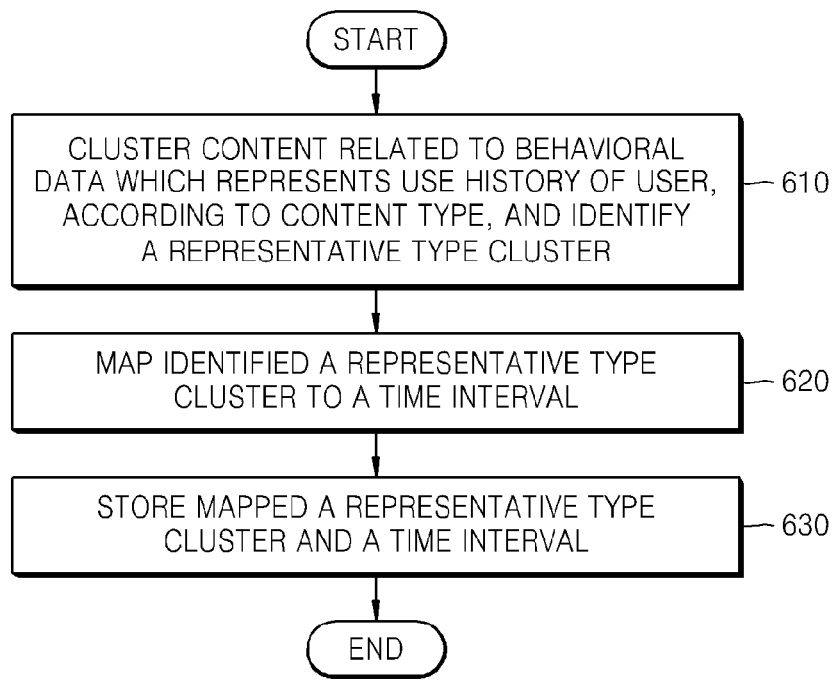
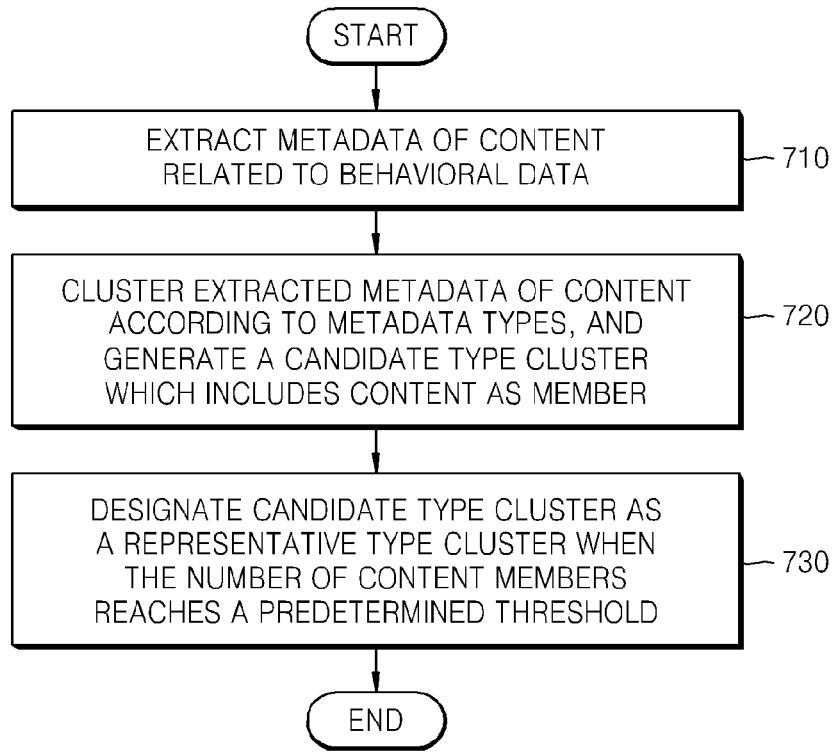

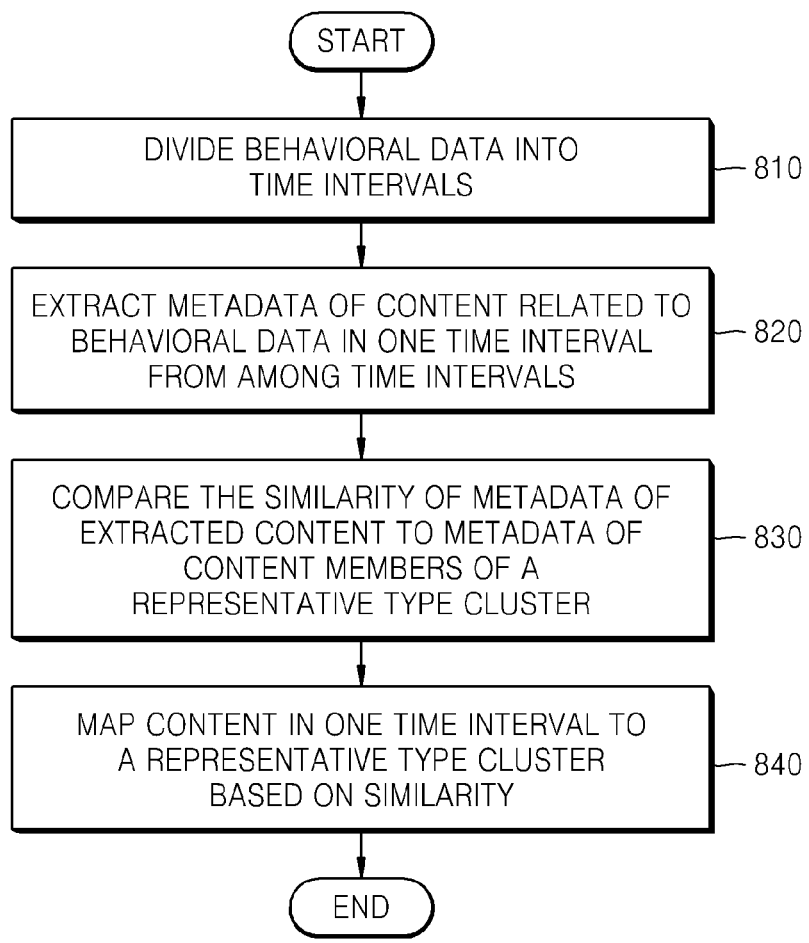

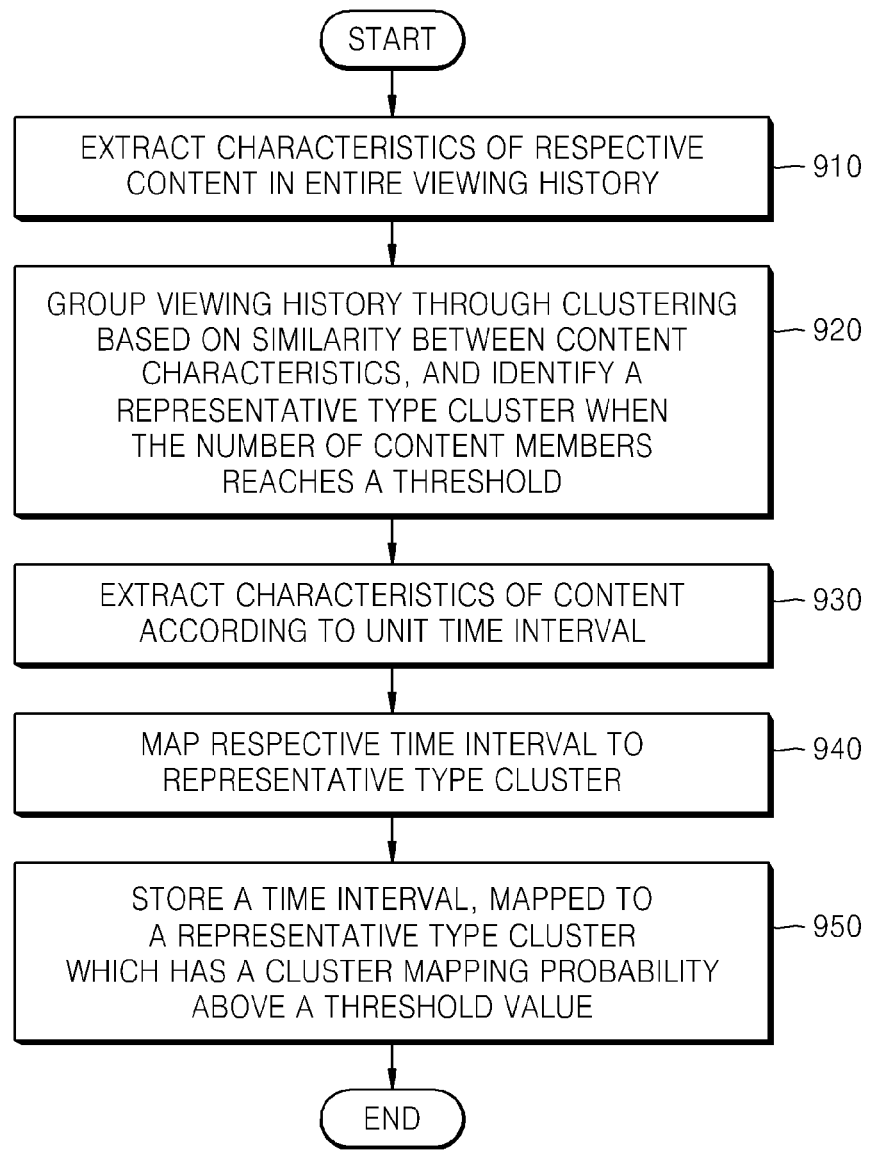

CONTENT-PROVIDING METHOD AND SYSTEM

PRIORITY

This application claims priority under 35 U.S.C. §119 to a Korean Patent Application No. 10-2010-0118105, which was filed in the Korean Intellectual Property Office on Nov. 25, 2010, the entire disclosure of which is incorporated herein in its entirety by reference.

BACKGROUND OF THE INVENTION

1. Field of the Invention

The present invention relates generally to a content-providing method and system, and more particularly, to a content-providing method and system for effectively supplying a customized service by classifying data regarding usage behavior of users into representative content types, analyzing the representative types, and identifying time intervals in which the representative types consistently occur, without having to use user identification information.

2. Description of the Related Art

In conventional customized service systems, identification of a current user is assumed and the most appropriate service for the user is matched to the user based on a past use history of the user. However, when a customized content-providing service is provided via a system such as a Television (TV), which is a representative family device, it is difficult to provide an appropriate customized service due to the difficulty of individually identifying all users viewing content. When personalized recommendation is made based on viewing history of users, which is generally the case, data regarding a viewing history of several users with various tastes is mixed and stored in one device such as the TV, without classifying users according respective tastes. Therefore, such impersonalized recommendation may frequently lead to an inappropriate recommendation result.

Thus, there is a need for development of technology for storing and managing data, such as a user's viewing history, according to time intervals and a history of the user's behavior regarding an apparatus, and information searching technology and data-mining technology for extracting viewing patterns according to time intervals and analyzing a similarity between viewed content, based on the data.

SUMMARY OF THE INVENTION

Accordingly, the present invention has been made to solve the above-mentioned problems, and to provide at least the advantages described below. An aspect of the present invention provides a content-providing method, a content-providing system, and a computer-readable recording medium for recording a program for performing the method.

According to an embodiment of the present invention, there is provided a content-providing method including identifying a representative type cluster by clustering content related to behavioral data which represents a use history of a user, according to types; mapping the representative type cluster to a time interval; and storing the representative type cluster and the time interval.

According to another embodiment of the present invention, there is provided a content-providing system, including a use history analyzer for identifying a representative type cluster by clustering content related to behavioral data which represents a use history of a user, according to type of the content; and a time interval identifier for mapping the representative type cluster on a time interval and for storing the representative type cluster and the time interval.

According to yet another embodiment of the present invention, there is provided a computer-readable recording medium for having recorded thereon a program for performing the content-providing method.

BRIEF DESCRIPTION OF THE DRAWINGS

The above and other aspects, features and advantages of the present invention will be more apparent from the following detailed description taken in conjunction with the accompanying drawings, in which:

FIG. 6 is a flowchart of a content-providing method according to an embodiment of the present invention.

FIG. 7 is a detailed flowchart illustrating operations of identifying a representative type cluster of FIG. 6.

FIG. 8 is a detailed flowchart illustrating operations of mapping a representative type cluster to a time interval.

FIG. 9 is a detailed flowchart illustrating a content-providing method according to an embodiment of the present invention.

DETAILED DESCRIPTION OF EMBODIMENTS OF THE PRESENT INVENTION

Figure 1:
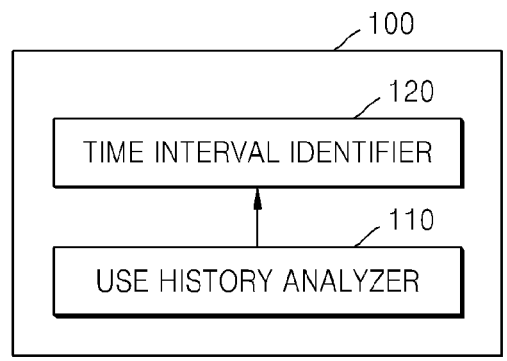
FIG. 1 is a block diagram of a content-providing system according to an embodiment of the present invention.

Hereinafter, the present invention will be described in greater detail with reference to the accompanying drawings, in which aspects of the present invention are illustrated. In the following description, like reference numerals in the drawings denote like elements in the drawings. Detailed descriptions of constructions or processes known in the art may be omitted to avoid obscuring the subject matter of the present invention.

FIG. 1 is a block diagram illustrating a content-providing system 100 according to an embodiment of the present invention.

Referring to FIG. 1, the content-providing system 100 includes a use history analyzer 110 and a time interval identifier 120.

The use history analyzer 110 performs clustering content related to behavioral data of a user which represents a use history of the user, according to types, thereby identifying a representative type cluster.

A type, according to the present invention may include a taste (or preference) of an unidentified user or user group. For example, behavioral data regarding children's user group taste may relate to animation-related content, and behavioral data regarding housewives' user group taste may relate to romance-related content, which is described in more detail below with reference to FIG. 5.

Referring back to FIG. 1, for example, the use history analyzer 100 is configured to extract metadata of content related to behavioral data and to perform clustering of the extracted metadata of content according to types, thus generating cluster types which include the content as members.

Then, the use history analyzer 100 is configured to identify a representative type cluster from among the cluster types, which includes content amounting to a predetermined threshold or higher as members.

A user, who is an unidentified user, may be a person, a group, or all users of a specific system.

Behavioral data may represent a use history of a user with regard to a service item provided by the content-providing system 100.

For example, the service item may include a customized content-recommendation service based on a viewing history in a Video On Demand (VOD) service, selection of a TV program at an airport, preparation of a customized promotion list based on major groups of customers (housewives, dual-income families, single-person families) at a shopping center or a market place according to time intervals, and customized advertisement and environment management (background music) based on tastes of major customers (students, commuters, general public) according to time intervals at a subway station. However, the service item is not limited thereto.

The use history may largely include a viewing history or a purchase history of content. The use history may also include various behaviors such as bookmarks, evaluations, and Internet connection sharing, which indicate a preference for specific content. For example, the use history may include all interactions of a user with regard to service items such as a TV viewing history, a VOD viewing history, a music listening history, a product purchase history, item clicking, bookmarks, and the like.

Referring back to FIG. 1, the time interval identifier 120 performs mapping of a identified representative type cluster to a time interval and stores the representative type cluster and the mapped time interval.

The time interval identifier 120 divides behavioral data into time intervals and extracts metadata of content related to behavioral data in one time interval from among the time intervals. Then, the time interval identifier 120 compares the extracted metadata of the content with metadata of content members in the representative type cluster so as to determine their similarity. Based on the similarity, the time interval identifier 120 is configured to perform mapping of the content in the one time interval to the representative type cluster. Here, the behavioral data may be divided into time interval units which are predetermined according to a use pattern.

Also, the time interval identifier 120 is configured to delete a representative type cluster in which a probability of cluster mapping is a threshold or less, based on a probability of cluster mapping of content, in one time interval, which are mapped respectively to the representative type cluster. Furthermore, if the entire representative type cluster has a probability which is a threshold or less, the time interval identifier 120 is be configured to delete the one time interval.

Also, the time interval identifier 120 is configured to prioritize respectively a representative type cluster based on a probability of cluster mapping.

As such, the content-providing system 100, according to an embodiment of the present invention, deals with a technology for detecting a time interval which shows a consistent viewing taste of a user or a group of users at a viewing time, in an apparatus in which a user is not identified.

A service for detecting a time interval for certain consistent preferences in an apparatus such as a TV used by a group of users may be used. Generally, as TV users do not normally provide identification information, it is difficult to accurately identify a current viewing user. Additionally, as several users may watch TV together, it is also difficult to provide a customized service. However, a TV viewing pattern may change according to time, and some viewing time intervals may have characteristics which are consistent and definitely different from other viewing time intervals.

Accordingly, a customized service system, according to an embodiment of the present invention, may supply an accurate customized service of content in a specific time interval, by using such characteristics without having to identify a user.

Figure 2:
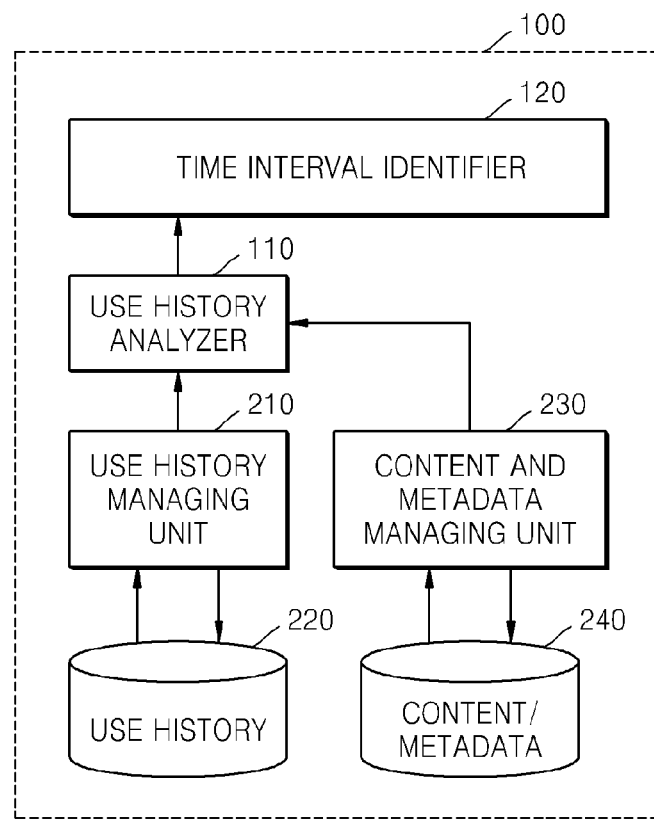
FIG. 2 is a detailed block diagram of the content-providing system of FIG. 1.

FIG. 2 is a detailed block diagram of the content-providing system of FIG. 1.

Referring to FIG. 2, the content-providing system 100 includes a use history managing unit 210, a content and metadata managing unit 230, the use history analyzer 110, and the time interval identifier 120. The content-providing system 100 further includes a use history storage unit 220 connected to the use history managing unit 210, and a content and metadata storage unit 240 connected to the content and metadata managing unit 230.

The use history managing unit 210 collects behavioral data from a user apparatus and stores the behavioral data with time information.

The user apparatus may be a client apparatus, for example, a TV or a Personal Computer (PC) having an Internet connection. The content-providing system 100, according to the present invention, may be a server apparatus for supplying a customized service to the user apparatus.

The use history managing unit 210 stores and manages behavioral data in an order of time. For example, the use history managing unit 210 stores a corresponding user apparatus Identification (ID), information regarding content purchased at a specific time from the corresponding user apparatus, and time information of the purchase in such a format as <Device id, Content id, Timestamp>. As a user is not identified, the use history managing unit 210 stores all records by using an ID of the corresponding user apparatus. For example, in a shopping mall, the use history managing unit 210 stores entire purchase-related behaviors of all personal users with time information.

The content and metadata managing unit 230 manages service items and metadata such as content, products, and services which are provided by a corresponding user apparatus. The content and metadata managing unit 230 also extracts and manages characteristics information about each content. For example, by using content metadata such as a title, caption, actors, and genre as features, the characteristics information may be expressed in a feature vector format.

The use history analyzer 110 configures a cluster by classifying content according to representative types, based on analysis of the content related to a use history of a specific user apparatus. Specifically, the use history analyzer 110 performs clustering content of all user behavioral data stored in each user apparatus. Clustering is performed by classifying similar content into groups.

The use history analyzer 110 performs grouping of content with similar characteristics by using characteristics information, i.e., metadata, which is extracted from the content and metadata managing unit 230 according to each content. The use history analyzer 110 measures a distance between content, and classifies content within a close distance into one group.

The use history analyzer 110 uses a representative k-means algorithm for the clustering, and may also use a cosine value or a Euclidean Distance between feature vectors, in order to measure a distance which represents a similarity between content. However, a method of clustering is not limited thereto, and various methods known to those of ordinary skill in the art may be used to perform the clustering.

Such a type of cluster may be characterized by a collection of content with a consistent taste or preference. Related content used by a plurality of users may be one type of cluster. Content used by one user may also be classified into several cluster types. Among such cluster types, the use history analyzer 110 identifies a representative type cluster which includes content, as a member, the number of which is a predetermined threshold or higher.

The time interval identifier 120 performs mapping of the representative type cluster to a time interval, which is analyzed in the use history analyzer 110. Referring to FIG. 3A, a method of performing the mapping is described in detail.

Figure 3:
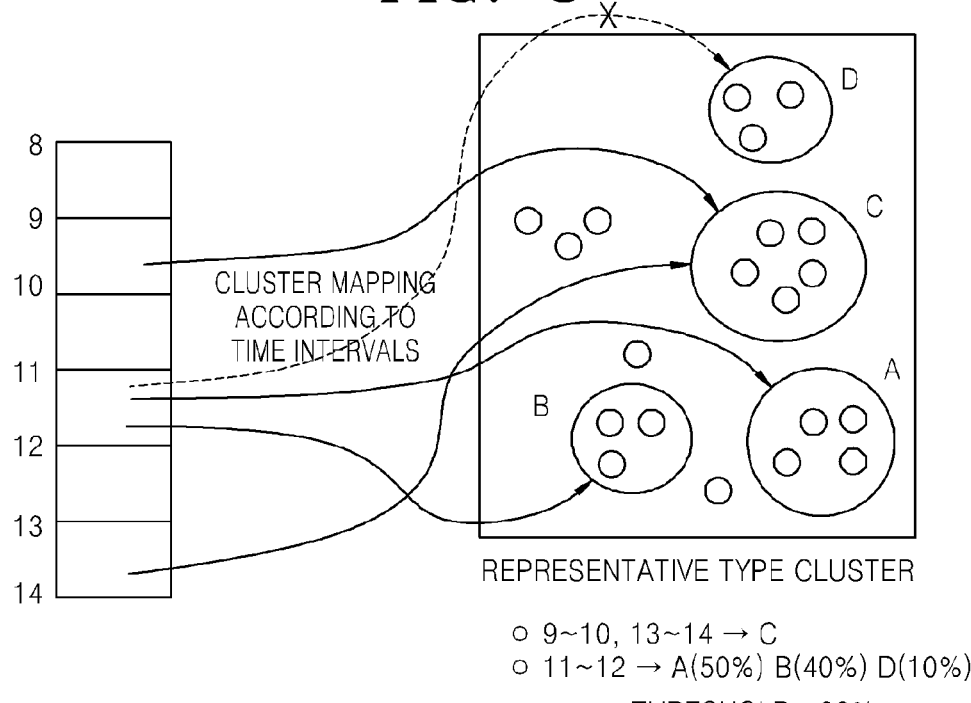
FIG. 3 is a diagram illustrating an operation method of a time interval identifier according to an embodiment of the present invention.

FIG. 3 is a diagram illustrating a method of operation of the time interval identifier 120 according to an embodiment of the present invention. 'A', 'B', 'C', and 'D' respectively indicate identified representative type clusters, 'A', 'B', 'C', and 'D'.

Referring to FIGS. 1 through 3, the time interval identifier 120 performs mapping of a representative type cluster to a time interval. The time interval identifier 120 divides a use history, i.e., behavioral data, into predetermined time interval units according to a use pattern. The time interval identifier 120 divides a day into time intervals, or accumulates data in time intervals according to a day of the week or for a long period of time.

Next, the time interval identifier 120 performs mapping of a representative type cluster to each time interval, based on cluster membership of content in a time interval, i.e., a probability of cluster mapping.

The time interval identifier 120 performs mapping of one representative type cluster to several time intervals, in case that users having the same taste emerge in two time intervals. For example, the representative type cluster 'C' is mapped to two time intervals from 9 to 10 o'clock and from 13 to 14 o'clock.

Furthermore, the time interval identifier 120 performs mapping of one time interval to several representative type clusters. In such a case, representative type clusters may be prioritized in an order from the most appropriate representative type cluster, according to a ratio of content in the corresponding time interval. The time interval identifier 120 excludes a representative type cluster in which a probability of cluster mapping is less than a specific threshold.

When 50 percent (%) of content in one time interval (11 to 12 o'clock) is mapped to the representative type cluster 'A', another 40% of the content is mapped to the representative type cluster 'B', and the remaining 10% of the content is mapped to the representative type cluster 'D', if a predetermined threshold is 30%, the time interval identifier 120 selects 'A' and 'B' and excludes 'D'. If a mapping probability of all representative type clusters is less than the threshold, that is, in a time interval with a mixed type (or taste), the time interval identifier 120 excludes the corresponding time interval.

A time interval which is identified as such may be applied to various customized services. Services may be further improved by providing services based on characteristics data of an identified representative type cluster, rather than by employing characteristics data only in one time interval.

Figure 4:
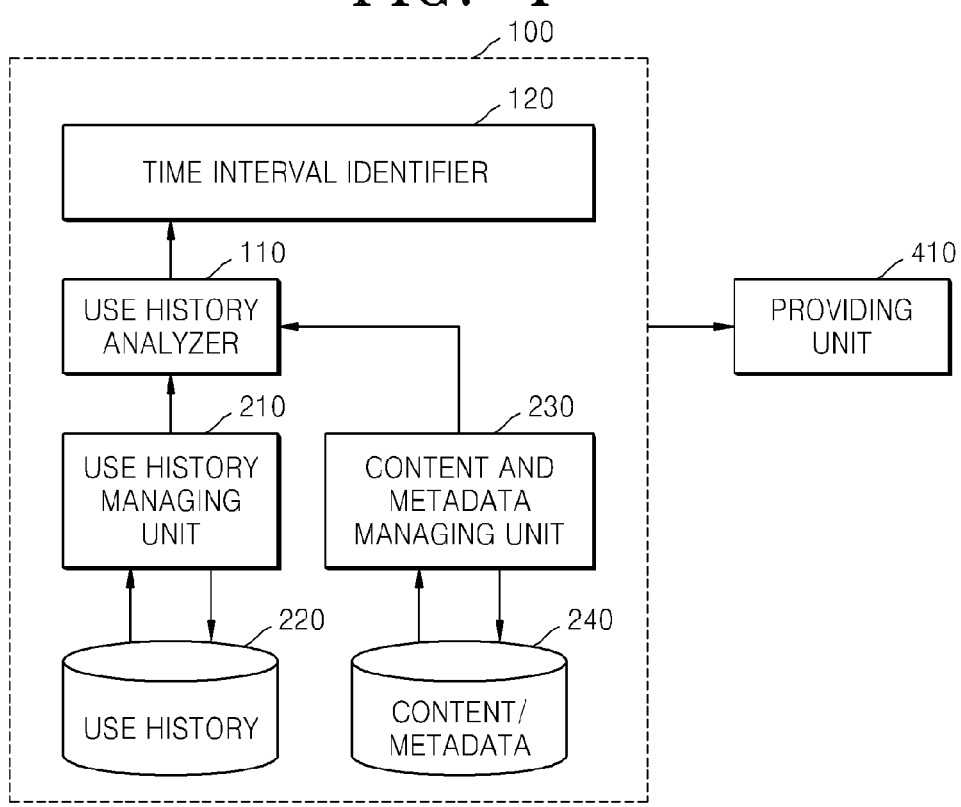
FIG. 4 is a more detailed block diagram of the content-providing system of FIG. 1.
Figure 5:
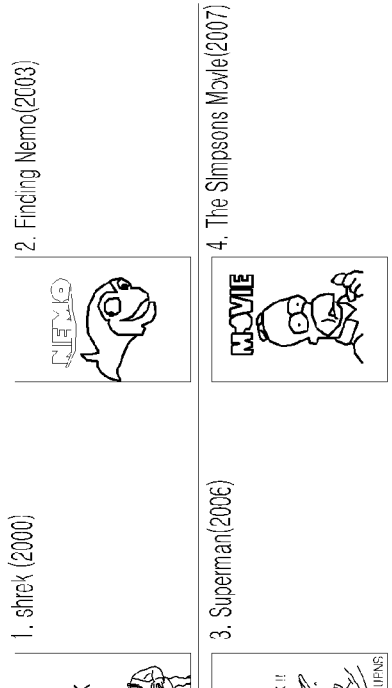
FIG. 5 is a diagram illustrating an example of content being provided by the content-providing system of FIG. 4.
Figure 5:
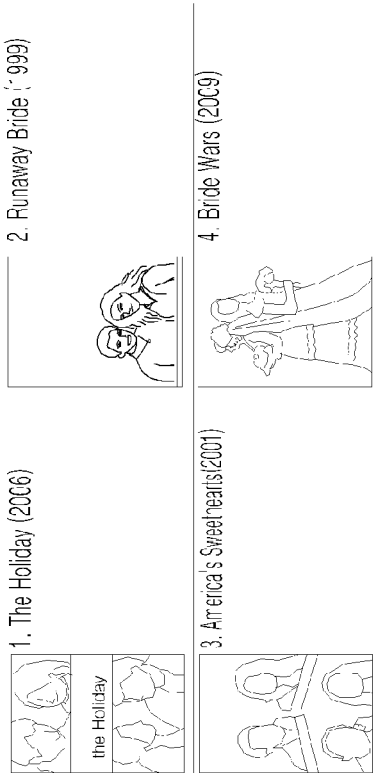
Figure 5:
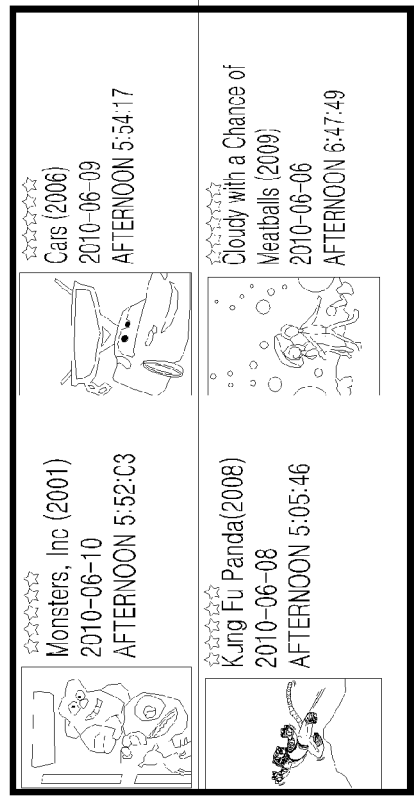
Figure 5:
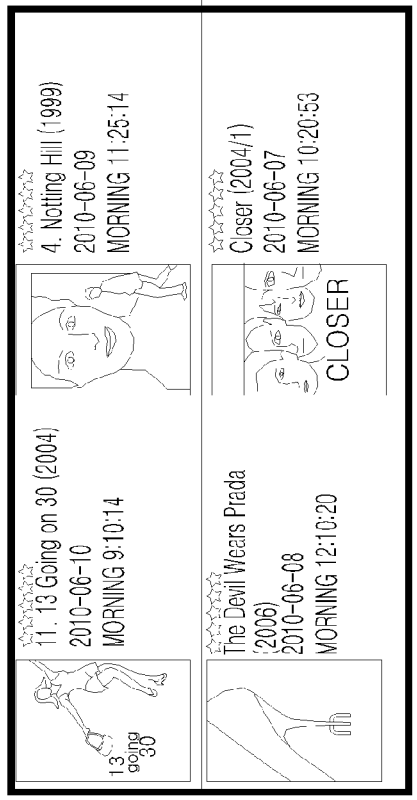

Referring to FIGS. 4 and 5, a method of applying the content-providing system 100 to various customized services is described.

FIG. 4 is a more detailed block diagram of the content-providing system of FIG. 1. Referring to FIG. 4, the content-providing system 100 includes the use history managing unit 210, the use history storage unit 220, the content and metadata managing unit 230, the content and metadata storage unit 240, the use history analyzer 110, the time interval identifier 120, and a providing unit 410. The use history managing unit 210, the use history storage unit 220, the content and metadata managing unit 230, the content and metadata storage unit 240, the use history analyzer 110, and the time interval identifier 120, which are the same as those of FIG. 2, and thus, will not be repeatedly described here.

The providing unit 410 provides content which is determined according to a representative type cluster mapped to a time interval. The content provided by the providing unit 410 includes service items such as customized services, customized advertisements, and the like.

For example, for a time interval related to several representative type clusters, the providing unit 410 provides content which is determined based on a representative type cluster having a highest priority, or sequentially provides content which is determined by using respective characteristics of prioritized representative type clusters.

In accordance with an embodiment of the present invention, providing of content may include recommendation of content.

For example, when a recommended time interval is mapped to only one representative type cluster, the providing unit 410 generates a recommendation in a recommended time interval based on a profile of the corresponding cluster. In such a case, even when a relatively short viewing history is in the corresponding time interval, several different viewing histories with similar tastes in the representative type cluster may be used, thus obtaining a stable recommendation result.

Furthermore, when a time interval is mapped to two or more representative type clusters, the providing unit 410 provides a recommendation to be proportional to a probability of membership to a respective type cluster. For example, the providing unit 410 provides a recommendation based on a profile of the representative type cluster 'A' at a probability of five-ninths (5/9), and may provide a recommendation based on a profile of the representative type cluster 'B' at a probability of four-ninths (4/9). Accordingly, a result of the recommendation may be basically different from a result obtained by mixing profiles of 'A' and 'B' and recommending the mixed profiles. Thus, at least four-ninths (4/9) of users may always be favorable to the recommendation result provided by the providing unit 410.

Eventually, the content-providing system 100 according to an embodiment of the present invention identifies and extracts a time interval which is consistently differentiated from other time intervals so as to provide an effective customized service, when an apparatus is used by several users, as in a family device, and when personal identification information is not provided. In an apparatus such as Internet TV, it is rare to provide identification information about a respective user during viewing of VOD content, and sometimes, it is impossible to provide identification information.

The content-providing system 100, according to an embodiment of the present invention, may provide a basis of supplying an effective customized service by analyzing viewing history data, which is accumulated without user identification information, according to representative types and by identifying a time interval in which the respective representative types consistently occur. Furthermore, through a time interval in which a representative type consistently occurs in the present invention, the content-providing system 100 enhances user satisfaction, and thus, promote additional consumption of content via recommendation of content, and may also attract users' attention, and thus, improve advertisement effects via customized advertisements.

FIG. 5 is a diagram illustrating an example of content being provided by the content-providing system of FIG. 4.

Referring to FIG. 5, the providing unit 410 recommends animation content in the early evening, based on a viewing history related to a children's user group tastes. The providing unit 410 also recommends romance-related content in the morning, based on a viewing history related to housewives' user group tastes.

Conventional content-providing systems may erroneously recommend content based on a mixed viewing history of several users and violent action programs may be recommended to children due to the to parents' viewing history of action movies, or animation content for children may be recommended to adults, thereby decreasing user satisfaction. Additionally, when a user who prefers comedies and another user who prefers crime movies view movies together, both users may be unsatisfied by the recommendation of a dark comedy, as a result of mere mixing of profiles.

On the other hand, a recommendation based on a time interval, which is extracted depending on types in the content-providing system 100 according to an embodiment of the present invention, may be a favorable result for each target user or user group.

Hereinafter, referring to FIGS. 6 through 9, a content-providing method according to an embodiment of the present invention is described. As the content-providing method is the same as the operation of the content-providing system 100 of FIGS. 1 through 4, the method will be described briefly.

FIG. 6 is a flowchart illustrating a content-providing method according to an embodiment of the present invention.

Referring to FIG. 6, in Step 610, content, related to behavioral data which represents a use history of a user, is clustered according to types, thus identifying a representative type cluster.

In Step 620, the identified a representative type cluster is mapped to a time interval.

In Step 630, the mapped representative type cluster and the time interval are stored.

Referring to FIGS. 7 and 8, the identifying of a representative type cluster in Step 601 and the mapping of the identified a representative type cluster to a time interval in Step 602 are described in more detail.

FIG. 7 is a detailed flowchart illustrating operations for identifying a representative type cluster in FIG. 6.

Referring to FIG. 7, in Step 710, metadata of content related to behavioral data is extracted.

In Step 702, the extracted metadata of the content is clustered according to types so that a candidate cluster type which includes the content as members is generated.

In Step 730, the candidate cluster type is designated as a representative type cluster when the number of content members reaches a predetermined threshold.

FIG. 8 is a detailed flowchart illustrating operations of the mapping of a representative type cluster to a time interval.

Referring to FIG. 8, in Step 810, the behavioral data are divided into time intervals.

In Step 820, metadata of content related to behavioral data in one time interval from among the time intervals is extracted.

In Step 830, the metadata of the extracted content is compared with metadata of content members in a representative type cluster to determine a similarity.

In Step 840, based on the similarity, the content in the one time interval is mapped to the representative type cluster.

FIG. 9 is a flowchart illustrating the content-providing method according to an embodiment of the present invention.

FIG. 9 illustrates a method of providing a service of recommending customized content based on a viewing history in a VOD service supplied from a TV or a PC having an Internet connection. However, a method of providing content is not limited thereto.

Referring to FIG. 9, in Step 910, characteristics of respective content in an entire viewing history are extracted. The characteristics of the respective content is metadata of the respective content.

In Step 920, a viewing history is grouped through clustering based on a similarity between the content characteristics, and a representative type cluster is identified when the number of content members reaches a threshold.

In Step 930, characteristics of the content according to time interval units are extracted.

In Step 940, the respective time intervals are mapped to the representative type cluster.

In Step 950, a time interval, mapped to a representative type cluster, which has a cluster mapping probability above a threshold value, is stored.

The above-described embodiments of the present invention can also be embodied as computer-readable codes on a non-transitory computer-readable recording medium. The computer-readable recording medium is any data storage device that can store data or software components that include instructions or code that can be read by a computer system. Examples of the computer-readable recording medium include Read-Only Memory (ROM), Random-Access Memory (RAM), Compact Disk (CD)-ROMs, magnetic tapes, floppy disks, optical data storage devices, and carrier waves (such as data transmission through the Internet). The computer-readable recording medium can also be distributed over network coupled computer systems so that the computer-readable code is stored and performed in a distributed fashion. Also, functional programs, codes, and code segments for implementing a content-providing method can be easily implemented by programmers of ordinary skill in the art to which the present invention pertains.

While the present invention has been shown and described with reference to certain embodiments thereof, it will be understood by those of ordinary skill in the art that various changes in form and detail may be made therein without departing from the spirit and scope of the present invention as defined by the appended claims.

What is claimed is:

1. A content-providing method comprising:
identifying, by one or more processors, one or more representative type clusters by clustering content related to behavioral data which represents use histories of one or more users, according to a type of the content;
extracting, by the one or more processors, metadata of content related to behavioral data in one time interval among one or more time intervals;
mapping, by the at least one or more processors, at least one of the one or more representative type clusters to the one time interval, based on similarity of the extracted metadata of the content in the one time interval with the metadata of content in the at least one representative type cluster;

deleting a representative type cluster which has a probability value of cluster mapping of content in the one time interval below a threshold value, based on a probability of cluster mapping of the content in the one time interval, which is mapped to the representative type cluster; and providing, by the one or more processors, content which is determined according to the at least one representative type cluster mapped to the one time interval.

2. The content-providing method of claim 1, wherein identifying the one or more representative type clusters comprises:

extracting metadata from the content related to the behavioral data;

generating a candidate type cluster which includes the content as members of the candidate type cluster, by clustering the extracted metadata of the content; and designating the candidate type cluster as a representative type cluster once a number of the content members included in the candidate type cluster reaches a predetermined threshold.

3. The content-providing method of claim 1, wherein mapping at least one of the one or more representative type clusters comprises:

comparing the similarity of the extracted metadata of the content in the one time interval with the metadata of the content in the at least one representative type cluster; and mapping the content in the one time interval to the representative type cluster, based on the compared similarity.

4. The content-providing method of claim 3, wherein mapping the at least one representative type cluster further comprises:

when a plurality of representative type clusters are mapped to the one time interval, ranking each of the plurality of representative type clusters based on a probability value of the cluster mapping of the content in each respective representative type cluster.

5. The content-providing method of claim 4, further comprising either:

providing content which is determined based on a representative type cluster with the highest rank, or sequentially providing content where the sequence is determined using respective characteristics of each of the ranked representative type clusters.

6. The content-providing method of claim 1, wherein time interval units are predetermined according to a use pattern.

7. A content-providing system, comprising:

one or more processors; and one or more non-transitory computer-readable media having recorded thereon one or more programs for executing the steps of:

identifying one or more representative type clusters by clustering content related to behavioral data which represents use histories of one or more users, according to a type of the content;

extracting metadata of content related to behavioral data in one time interval among one or more time intervals;

mapping at least one of the one or more representative type clusters to the one time interval, based on similarity of the extracted metadata of the content in the one time interval with the metadata of content in the at least one representative type cluster;

storing the mapped at least one representative type cluster and its respective time interval;

deleting a representative type cluster which has a probability value of cluster mapping of content in the one time interval below a threshold value; and providing content which is determined according to the at least one representative type cluster mapped to the one time interval, wherein at least one of the one or more non-transitory computer-readable media stores at least one of the use history and mapped representative type clusters and their respective time intervals.

8. The content-providing system of claim 7, wherein the step of identifying one or more representative type clusters comprises:

extracting metadata from the content related to the behavioral data;

generating a candidate type cluster which includes the content as members of the candidate type cluster, by clustering the extracted metadata of the content; and designating the candidate type cluster as a representative type cluster once a number of the content members included in the candidate type cluster reaches a predetermined threshold.

9. The content-providing system of claim 7, wherein the step of mapping at least one representative type cluster comprises:

comparing the similarity of the extracted metadata of the content in the one time interval with the metadata of the content in the at least one representative type cluster; and mapping the at least one representative type cluster to the one time interval based on the compared similarity.

10. The content-providing system of claim 9, wherein step of mapping at least one representative type cluster further comprises:

when a plurality of representative type clusters are mapped to the one time interval, ranking each of the plurality of representative type clusters based on a probability value of the cluster mapping of the similar content in each respective-representative type cluster.

11. The content-providing system of claim 10, wherein the one or more programs further execute the step of either:

providing content which is determined based on a representative type cluster with the highest rank, or sequentially providing content where the sequence is determined using respective characteristics of each of the ranked representative type clusters.

12. The content-providing system of claim 7, wherein the time interval units are predetermined according to a use pattern.

13. The content-providing system of claim 7, wherein at least one of the one or more non-transitory computer-readable media store the behavioral data with time information and wherein the one or more programs further execute the step of managing content regarding provided service items and metadata regarding the content.

14. A non-transitory computer-readable recording medium having recorded thereon a program for executing a content-providing method comprising:

identifying, by one or more processors, one or more representative type clusters by clustering content related to behavioral data which represents use histories of one or more users, according to a type of the content;

extracting, by the one or more processors, metadata of content related to behavioral data in one time interval among one or more time intervals;

mapping, by the at least one or more processors, at least one of the one or more representative type clusters to the one time interval, based on similarity of the extracted metadata of the content in the one time interval with the metadata of content in the at least one representative type cluster;

deleting a representative type cluster which has a probability value of cluster mapping of content in the one time interval below a threshold value, based on a probability of cluster mapping of the content in the one time interval, which is mapped to the representative type cluster; and providing, by the one or more processors, content which is determined according to the at least one representative type cluster mapped to the one time interval.

* * * * *